Sept. 15, 1953  F. L. WASSELL  2,652,059
INDEX CARD AND REMOVABLE INDEX TAB
Filed Nov. 15, 1950  2 Sheets-Sheet 1
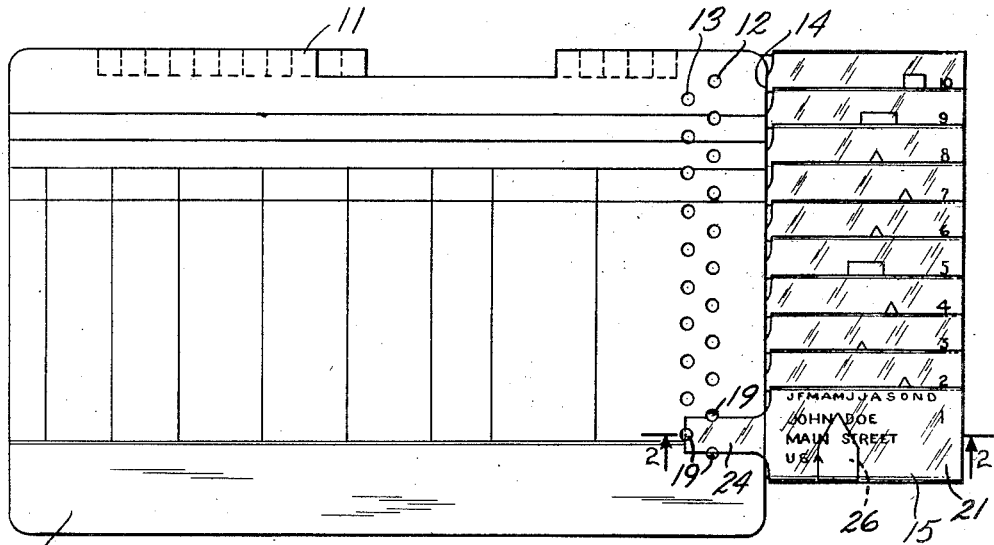
FIG.1.
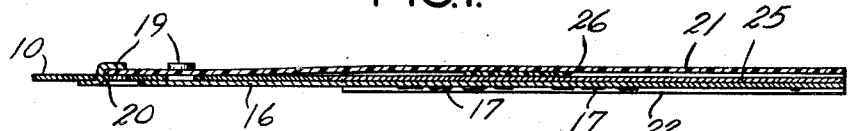
FIG.2.
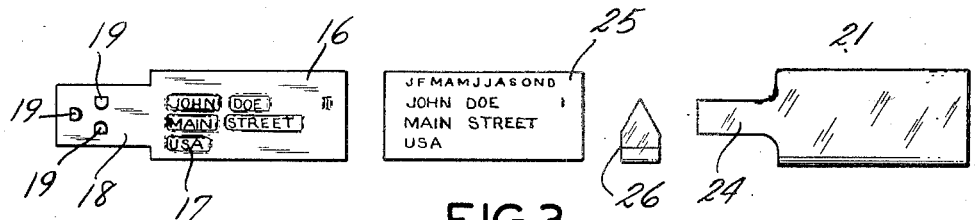
FIG.3.
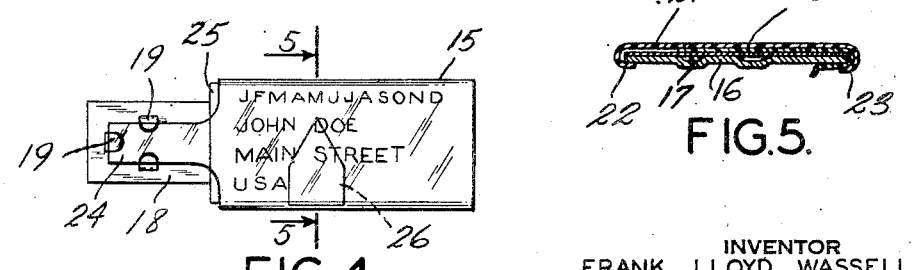
FIG.4.
FIG.5.
INVENTOR
FRANK LLOYD WASSELL
BY
his ATTORNEYS

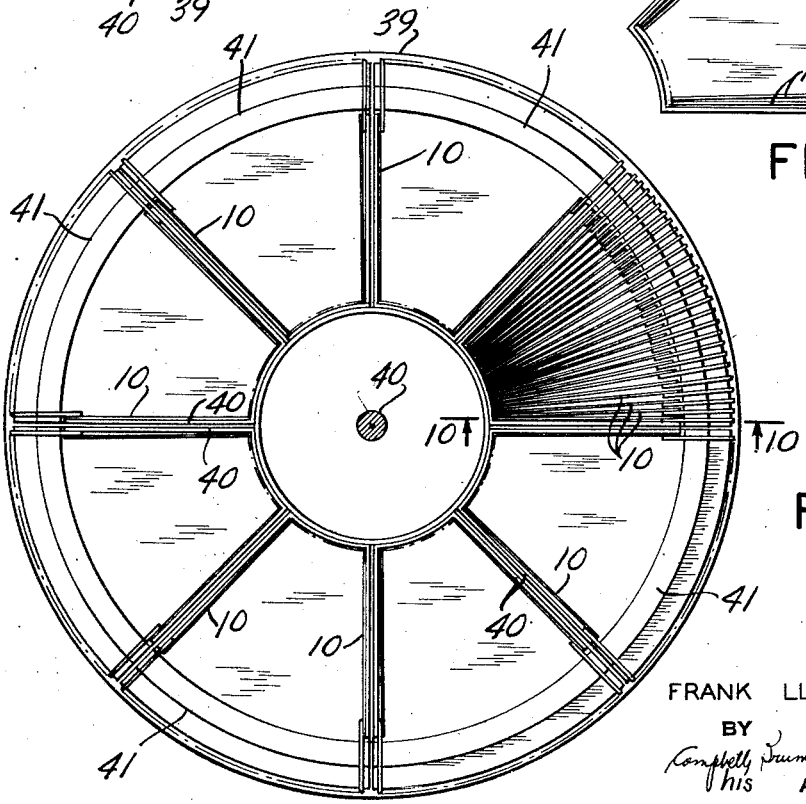

Patented Sept. 15, 1953

2,652,059

UNITED STATES PATENT OFFICE 2,652,059

INDEX CARD AND REMOVABLE INDEX TAB

Frank Lloyd Wassell, Westport, Conn., assignor to Georgene Parkin Wassell, Westport, Conn.

Application November 15, 1950, Serial No. 195,835

6 Claims. (Cl. 129—16.8)

The present invention relates to an improved form of index card for use in visible index mechanisms and embodies, in that connection, not only an improved form of index card, but also an improved index mechanism by means of which cards of an index file may have secured thereto index tabs or plates in such fashion as to greatly facilitate not only the use of the cards, but also ancillary operations in business procedures in connection with which the cards may be used.

Visible card index systems of many forms have heretofore been provided, wherein the index cards are provided with tabs of one form or another formed along one margin of the card and formed out of the material of the card. These mechanisms have also been formed with various forms of adjustable indicia, and an object of the present invention is to provide an improved form of index mechanism for cards to be used in card indexes by means of which the indexing indicia may be adjusted conveniently from time to time to enable the card to occupy a desired position in a series of indexed cards, and also to facilitate the operation of addressing bills, statements and other literature to persons to whom the subject matter of the respective cards refers.

As an illustration, one advantage accruing from the present invention lies in the field of retail sales accounts receivable. In most large retail stores the practice is to maintain a ledger account and a separate "Addressograph" or plate department in which the printing plates for all of the accounts are maintained. In the ledger account there is usually a credit card between the respective ledger cards and, as sales are made, a copy of each sales slip is filed between the two cards until the billing date. Just prior to the billing date, the plate department runs off a blank statement for each account. The statements are then stuffed in front of each open account, the statement blank being destroyed if there are no attendant charges for such account. The accounting machine operator then places the ledger cards and corresponding statement blank in the machine and lists the items of the sales slips on the statement and the total on the ledger card. The sales slips are then attached to the statement and mailed to the customer, and the ledger card is returned to the ledger file. It will be seen that this practice involves numerous operations and necessitates considerable wastage of statement blanks (an average of about forty per cent. of the accounts have been found to be inactive each month).

It is an object of this invention to greatly simplify the accounting procedures above outlined and also to avoid wastage of statement blanks.

The foregoing and other objects are attained by providing, in combination with an index card formed in a unique way, indexing apparatus which may be adjustably secured at the margin of the card and that afford means for carrying printing elements by means of which the indexing means may be used for addressing purposes.

The invention will be understood more specifically by reference to the accompanying drawings, wherein Figure 1 is a plan view of a series of index cards formed in accordance with the present invention and having secured thereto, adjacent one margin thereof, indexing mechanism constructed in accordance with the present invention;

Figure 2 is a partial view in cross-section and enlarged showing one index card and tab structure constructed in accordance with the present invention, this view being taken on the section line indicated at 2—2 in Figure 1;

Figure 3 is a plan view of the index tab structure in disassembled relationship;

Figure 4 is a plan view of the elements of Figure 3 in assembled relationship;

Figure 5 is a view in transverse section taken on the line 5—5 of Figure 4 and looking in the direction of the arrows;

Figure 6 is a view similar to Figure 3, showing a modified form of the invention;

Figure 7 is a view similar to Figure 4, showing the elements of Figure 6 in assembled relationship;

Figure 8 is a view in cross-section, taken on line 8—8 of Figure 7, and looking in the direction of the arrows;

Figure 9 is a plan view of a rotary file in connection with which the present invention may be utilized;

Figure 10 is a partial view in section, taken on line 10—10 of Figure 9, and looking in the direction of the arrows; and Figure 11 is a plan view showing one of the pie-shaped trays utilized in the device of Figure 9.

Referring to the above drawings, an index card for a card index mechanism is illustrated at 10 and in Figure 1 there is shown a plurality of such cards in stacked relationship. These cards may be formed with desired printed matter and tabulations in accordance with well known practice, and one or more margins thereof may be provided with removable indicia means such as is illustrated at 11. These and other structural features of the cards form no part of the invention and, therefore, need not be described in greater detail herein.

The important aspect of the cards 10 is illustrated in Figure 1 wherein the cards are formed adjacent one edge thereof (in the form shown herein adjacent the right-hand edge) with a plurality of rows of holes 12 and 13. The holes of the outermost row 12 are equally spaced and lie in a common line parallel to the right-hand edge 14 of the card. Inwardly of the row of holes 12, a second row of holes 13 is provided, this row also being parallel to the outer edge 14. The holes are in staggered relationship with respect to the holes of the row 12, as illustrated in Figure 1.

In accordance with the present invention each or any of the cards 10 may have secured thereto an indexing tab illustrated generally at 15 in Figure 1. The structure of the indexing tab 15 is illustrated in further detail in Figures 2 to 5, and it will be seen that the tab 15 is formed as a plate 16 in which printing indicia 17 is formed. The plate 16 thus forms a means by which suitable indicia may be printed as, for example, in an "Addressograph" printing operation. At one end of the plate 16 an arm 18 is formed, this arm having pressed out of the material thereof a plurality of extensions or tabs 19. As will be seen in Figures 2, 3, and 4, the tabs form recesses 20, all of which face inwardly and serve as a means by which the tab may be locked removably in position upon the card 10.

A transparent acetate cover plate 21 is formed with re-entrant flanges 22 and 23 which are adapted to engage over and slide upon the corresponding edges of the plate 16. An arm 24 is formed upon the plate 21 and is adapted to slide into and engage the recesses 20 when the plate 21 is assembled over the plate 16. A card 25 is provided with suitable indicia and is placed between the plates 16 and 21 when the latter are assembled in the relationship shown in Figure 1, and thus the assembled mechanism provides not only the desired indexing indicia upon the forward face of the tab 15, but also the tab provides a printing plate upon its rear face by means of which suitable addressing operations may be carried out by using the tab in addressing machines of conventional form.

Suitable variable indicia or indicators, such as shown at 26, may be assembled in the tab structure as illustrated in Figures 1, 4, and 5, and thus the index tab structure may be used for a wide variety of adaptations.

In operation, the tabs 19 of the plate 16 are inserted through the appropriate holes of the rows of holes 12 and 13 on an appropriate card 10, and after assembling the indicia card 25 and any indicating devices, such as indicator 26, the cover plate 21 is slid into position with its flanges 22, 23 engaging the corresponding edges of the plate 16. The arm 24 is directed into the recesses 20 formed by the tabs 19, as illustrated in Figures 1, 2, and 4, and the card 10, with the index tab 15 removably secured thereto, is then ready for use.

In Figures 6, 7, and 8 a modified form of the invention is shown wherein a plate 27 is provided with printing indicia 28 formed therein and formed with turn-back flanges 29 within which an indicia bearing card 30 is adapted to be received, a transparent cover plate 31 being adapted to overlie the plate 30 and being formed with a tab or extension 32 which is adapted to be received within tabs 33 that are of similar formation to the tabs 19. The transparent cover plate 31 may be formed with cutaway portions 34 and 35 and, in order that the plate 27 may be secured to the card 10 without distorting the edge of the latter substantially, the flanges 29 are preferably either removed or flattened at the left-hand end of the plate as viewed in Figure 6, such flattening or removal extending from the region indicated at 36 to the left-hand end of the plate. A retaining tab 37 may be formed on the plate 27 to prevent accidental removal of the cover plate 31, this tab being received within a cutaway portion 38 of the cover plate.

This form of card is particularly useful with card index mechanisms wherein the cards are assembled in radial positions with respect to a common vertical axis as illustrated, for example, in applicant's co-pending application for patent Serial No. 80,540, filed in the United States Patent Office on March 9, 1949. In methods of this character the bulk occasioned by the indexing tab structure 15 can be accommodated in view of the greater space available at the outer edge than at the inner edge of the card. Such an embodiment of the invention is illustrated in Figures 9, 10, and 11 wherein one section of a rotary file is illustrated as being provided with a rotary member 39 mounted for rotation upon a central shaft 40 so that it may rotate in a horizontal plane. Upon this rotatable member there are adapted to be received a plurality of pie-shaped compartments or sectors 40, each of which is formed with a peripheral rib 41 which is adapted to retain the cards 10 therein against radially outward displacement.

As will be seen in each of Figures 9 and 11, the outer circumference of the rotatable member and the pie-shaped segments is of considerably greater extent than the inner circumference. This affords substantially more circumferential room at the outer portions than at the inner portions and thus accommodates the cards 10 with the indexing and printing mechanism connected to the outer edges thereof.

The structure of the present invention lends itself to convenient addressing operations in view of the fact that the tab 15 is formed, on its rear face, with the printing elements required by addressing machines, such as the conventional "Addressograph" machine. The position of the tab along the margin 14 of the index card may be quickly and easily varied by sliding the plate 21 sufficiently far to the right to clear the tabs 19 and then removing the tabs from the holes and reinserting them into the appropriate holes of the rows of holes 12 and 13, following which the cover plate 21 is slid to the left until the arm 24 re-engages the recesses 20 of the tabs 19.

From the foregoing, it will be seen that the operation of billing customers may be greatly simplified inasmuch as the "Addressograph" or plate department is eliminated, and it is only necessary for the accounting machine operator to remove the cards for the active accounts from the ledger file and insert them in the machine (the plate being attached to the credit card). The items of the sales slips would then be applied to the statement form in the machine, and the operation of the machine would print the plate indicia on the form, thus greatly simplifying the procedure and avoiding wastage of statement forms.

Moreover, analysis of delinquent accounts by means of indicators, such as 26, is greatly facilitated, and the addressing of statements to delinquent accounts similarly facilitated. These savings apply, not only to the operations above described, but also to numerous other applications, such as installment accounts of finance companies, and to all manner of billing, inventory, and purchase records.

While the invention has been described with specific reference to the accompanying drawings, it is not to be limited save as defined in the appended claims.

I claim:

1. An index card having adjacent one edge thereof a plurality of spaced apertures adapted to receive means for holding index tabs removably therein, an index tab for the card formed with an arm having spaced extensions adapted to be received in any two apertures of the card, and a face plate slidably mounted on the tab and having an extension thereon adapted to engage and lock the spaced extensions of the tab to the card.

2. An index card having adjacent one edge thereof a plurality of apertures formed in staggered relationship in a plurality of rows parallel to such edge, an index tab having an arm formed with a plurality of extensions adapted to be received in apertures in each of the rows, and a face plate slidably mounted on said tab to lock the extensions in the apertures.

3. An index card having adjacent one edge thereof a plurality of apertures formed in staggered relationship in a plurality of rows parallel to such edge, an index tab having an arm formed with a plurality of extensions adapted to be received in adjacent apertures in one of the rows and with at least one extension adapted to be received in an aperture in the other of the rows, and a face plate slidably mounted on said tab to lock the extensions in the apertures.

4. An index card having adjacent one edge thereof a plurality of apertures formed in staggered relationship in a plurality of rows parallel to such edge, an index tab having an arm formed with a plurality of extensions adapted to be received in apertures in each of the rows, and means to lock the extensions in the apertures, comprising a transparent plate formed with flanges overlying spaced sides of the tab and slidable thereon, said plate having an arm adapted to enter and engage the recesses.

5. An index card having adjacent one edge thereof a plurality of spaced apertures, an attachment having a plurality of tongues to pass through said apertures, said tongues having offset portions directed inwardly of said attachment, and a face plate slidably mounted on said attachment and movable between said tongues and beneath the offset portions to lock said attachment to the card.

6. An index card having adjacent one edge thereof a plurality of apertures spaced apart in a plurality of rows parallel to such edge and in staggered relationship, an attachment having three tongues spaced in staggered relationship to pass through three of said apertures, said tongues having offset portions directed inwardly of said attachment, and a transparent face plate slidably mounted on said attachment and movable between said tongues and beneath the offset portions to lock said attachment to said card.

FRANK LLOYD WASSELL.

References Cited in the file of this patent

UNITED STATES PATENTS

| Number | Name | Date |
|---|---|---|
| 753,153 | Lonquist | Feb. 23, 1904 |
| 850,324 | Seyl et al. | Apr. 16, 1907 |
| 1,690,889 | Dawson | Nov. 6, 1928 |
| 1,765,370 | Gollwitzer | June 24, 1930 |
| 1,790,451 | Wagner | Jan. 27, 1931 |
| 1,975,662 | Rand | Oct. 2, 1934 |
| 2,164,133 | Efron | June 27, 1939 |

FOREIGN PATENTS

| Number | Country | Date |
|---|---|---|
| 177,278 | Switzerland | 1935 |